(12) United States Patent
Owens

(10) Patent No.: US 8,815,351 B2
(45) Date of Patent: Aug. 26, 2014

(54) METHOD FOR ATTACHMENT OF SILICON-CONTAINING COMPOUNDS TO A SURFACE AND FOR SYNTHESIS OF HYPERVALENT SILICON-COMPOUNDS

(75) Inventor: Jeffrey R. Owens, Panama City, FL (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 1143 days.

(21) Appl. No.: 12/362,890

(22) Filed: Jan. 30, 2009

(65) Prior Publication Data

US 2009/0176424 A1  Jul. 9, 2009

Related U.S. Application Data

(63) Continuation-in-part of application No. 11/527,662, filed on Sep. 15, 2006, now abandoned.

(60) Provisional application No. 60/722,399, filed on Sep. 15, 2005.

(51) Int. Cl.
*B05D 3/06* (2006.01)
*B32B 9/00* (2006.01)

(52) U.S. Cl.
USPC ........................................................ 427/553

(58) Field of Classification Search
USPC ........................................ 427/508, 515, 553
See application file for complete search history.

(56) References Cited

U.S. PATENT DOCUMENTS

| | | | |
|---|---|---|---|
| 4,011,197 A | 3/1977 | Lee | |
| 4,891,241 A * | 1/1990 | Hashimoto et al. | 427/520 |
| 5,232,748 A | 8/1993 | Horowitz et al. | |
| 5,709,957 A * | 1/1998 | Chiang et al. | 428/615 |
| 5,710,651 A * | 1/1998 | Logan, Jr. | 398/168 |
| 5,866,027 A | 2/1999 | Frank et al. | |
| 5,910,370 A | 6/1999 | Katsura et al. | |
| 6,013,855 A * | 1/2000 | McPherson et al. | 623/23.76 |
| 6,573,009 B1 | 6/2003 | Noda et al. | |
| 6,969,769 B2 | 11/2005 | Worley et al. | |
| 7,517,496 B2 | 4/2009 | Pohl | |
| 7,557,035 B1 | 7/2009 | Ryan et al. | |
| 7,799,843 B2 | 9/2010 | Muramatsu et al. | |
| 7,842,387 B2 | 11/2010 | Resasco et al. | |
| 2003/0017464 A1 | 1/2003 | Pohl | |
| 2003/0124584 A1 | 7/2003 | Mohammed | |
| 2003/0228613 A1 | 12/2003 | Bonarth et al. | |
| 2004/0127667 A1 | 7/2004 | Worley et al. | |
| 2006/0210466 A1 | 9/2006 | Mitra et al. | |
| 2007/0298669 A1 | 12/2007 | Barrera et al. | |
| 2009/0061649 A1 | 3/2009 | Gates et al. | |
| 2009/0124625 A1 | 5/2009 | Bessis et al. | |

* cited by examiner

*Primary Examiner* — Elena T Lightfoot
(74) *Attorney, Agent, or Firm* — AFMCLO/JAZ; Fredric Sinder

(57) ABSTRACT

A method for attaching silicon-containing compounds to a surface and for synthesis of hypervalent silicon-compounds is described. Attaching silicon-containing compounds to a surface comprises providing a silicon-containing compound having two or more leaving groups, and a first functional compound comprising at least one nucleophilic group, contacting the silicon-containing compound and the functional compound with a surface of a substrate having nucleophilic sites and exposing the silicon-containing compound, the functional compound and the surface of the substrate to microwave radiation.

7 Claims, No Drawings

METHOD FOR ATTACHMENT OF SILICON-CONTAINING COMPOUNDS TO A SURFACE AND FOR SYNTHESIS OF HYPERVALENT SILICON-COMPOUNDS

CROSS-REFERENCE TO RELATED APPLICATIONS

This application is a continuation in part of U.S. patent application Ser. No. 11/527,662, titled "Method for Attachment of Silicon-Containing Compounds to a Surface and for Synthesis of Hypervalent Silicon Compounds," filed Sep. 15, 2006, which application claimed priority from U.S. provisional patent application Ser. No. 60/722,399, titled "Attachment of Silanol Silyl Ether, and Silanolate Functionalized Compounds to Substrates and Surface Using Electromagnetic Radiation," filed Sep. 15, 2005, which is incorporated by reference into this description.

RIGHTS OF THE GOVERNMENT

The invention described herein may be manufactured and used by or for the Government of the United States for all governmental purposes without the payment of any royalty.

BACKGROUND

The present invention relates to a method for producing a material with at least one functionalised surface. In particular, the present invention provides a method for functionalising a surface of a substrate by binding functional compounds thereto. The functional compounds when attached to or organised on the surface may have different physical and/or chemical properties compared to the starting materials.

The chemical attachment of silicon-containing compounds to surfaces is known to the skilled person. Conventionally, this is achieved by contacting a suitable surface with a suitable silicon-containing compound in the presence of an activator and heating the surface. The reaction between the surface and the silicon-containing compound is relatively slow. An example of the attachment of siloxanes to a polyester/cotton fabric using the application of heat is disclosed in U.S. Pat. No. 4,417,066.

It is also known to contact a suitable surface with a suitable silicon-containing compound and expose the compound and the surface to microwave radiation. The reaction between the surface and the silicon-containing compound is relatively fast. Such a silicon attachment technique is disclosed in U.S. patent application Ser. No. 11/527,662.

SUMMARY OF THE INVENTION

In a first aspect, the present invention provides a method for functionalising a surface of a substrate. The method comprises providing a silicon-containing compound having two or more leaving groups, and a functional compound comprising at least one nucleophilic group. The silicon-containing compound and the functional compound are then contacted with a surface of a substrate having nucleophilic sites thereon. Then the silicon-containing compound, the functional compound and the surface of the substrate are subjected to microwave radiation.

In a second aspect, the present invention provides another method for functionalising a surface of a substrate. The method comprises providing a silicon-containing compound attached to a first functional compound and having two or more leaving groups, and a second functional compound comprising at least one nucleophilic group. The silicon-containing compound and the second functional compound are then contacted with a surface of a substrate having nucleophilic sites thereon. Then the silicon-containing compound, the second functional compound and the surface of the substrate are subjected to microwave radiation.

In a third aspect, the present invention provides another method for functionalising a surface of a substrate. The method comprises a number of steps. The first of these is providing a first silicon-containing compound attached to a first functional compound and having at least one leaving group, and a second silicon-containing compound attached to a second functional compound and having at least one leaving group. The first and second functional compounds are different. The first and second silicon-containing compounds are then contacted with a surface of a substrate having nucleophilic sites thereon. Then the first and second silicon-containing compounds and the surface of the substrate are all subjected to microwave radiation.

In the first, second and third aspects of the present invention the surface of the substrate may be on an exterior or interior of a substrate. The substrate may, for example, be a porous polymer matrix and the silicon-containing compounds may be arranged on or attached to the interior surfaces of the pores of the matrix.

In a fourth aspect, the present invention provides a fabric material comprising a functionalised substrate having one or more functional compounds bound by one or more silicon-containing compounds to the surface thereof, wherein the functional compounds are attached to the surface by a method of the present invention.

In a fifth aspect, the present invention provides a gel, lotion, cream or adhesive composition comprising a functionalised substrate having one or more functional compounds bound by one or more silicon-containing compounds to the surface thereof, wherein the functional compounds are attached to the surface by a method of the present invention.

DETAILED DESCRIPTION

The present invention will now be further described. In the following passages different aspects of then invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The first, second and third aspects of the present invention provide a method for functionalising a surface of a substrate. That is, a method of providing a surface with one or more new or enhanced functional properties. Such properties include, but are not limited to, being flame retardant, oleophobic, antimicrobial, oleophilic, hydrophobic, hydrophilic, haemostatic, biocidic or sporicidic. Other properties include catalytic properties, antiviral properties, anti-corrosion properties, detoxification properties, reducing properties, oxidising properties, gas/vapour permeability control, liquid permeability control, surface energy control or surface morphology control. The surface could also be provided with an enzyme to provide enzymatic benefits or a crosslinking precursor (such as an epoxide) to allow subsequent crosslinking of the surface to itself or to another surface or compound.

The present invention relies on the microwave activated reaction of a silicon-containing compound to bind functional compounds to the surface of a substrate. Accordingly, the functional compounds become chemically attached to the surface of a substrate via silicon linkers (silicon-containing compounds). Thus the functional compounds are considered to have become 'silicon-bound' to the surface. It is, of course, preferable that the silicon-binding does not involve or hinder those moieties of the functional compound(s) that provide the functional compound(s) with its functionality.

According to the first aspect of the present invention there is provided a method for functionalising a surface of a substrate, the method comprising:
providing
a silicon-containing compound having two or more leaving groups, and
(ii) a first functional compound comprising at least one nucleophilic group;
contacting the silicon-containing compound and the functional compound with a surface of a substrate having nucleophilic sites thereon; and
exposing the silicon-containing compound, the functional compound and the surface of a substrate to microwave radiation.

In one embodiment of the first aspect of the present invention, more than one functional compound is provided. The use of more than one different functional compound allows the provision of a multifunctionalised surface of a substrate. Each functional compound provided comprises at least one nucleophilic group. In one embodiment each functional compound provided optionally has two or more nucleophilic groups. This allows the functional compound to adhere, or 'silicon-bind', to the substrate via more than one silicon-containing compound. This can enhance the resilience of the functionalised substrate. For example, when the substrate is an item of clothing it can be made to retain its functionality after a greater number of machine-wash cycles.

In a preferred embodiment of the first aspect of the present invention, the silicon-containing compound has four leaving groups. For simplicity and processing efficiency it is preferred that the four leaving groups are the same. Having extra leaving groups allows the silicon-containing compound to form extra bonds to the surface of the substrate, the first functional compound and/or any other functional compounds included.

In one embodiment the silicon-containing compound used in the first aspect is selected from orthosilicic acid ($Si(OH)_4$), a tetraalkoxysilane, preferably tetramethoxysilane or tetraethoxysilane, a tetraacyloxysilane, preferably tetraformyloxysilane or tetraacetoxysilane, tetraminosilane, or a tetra(alkylamino)silane. It is preferred that any alkyl chains in these compounds are of $C_1$ to $C_6$ chain length. These compounds may also be used as precursors for the silicon-containing compounds having a functional compound attached thereto that are discussed below. Further silicon-containing compounds which can be used in the first aspect, provided that they have two or more leaving groups, are described below.

According to the second aspect of the present invention there is provided a method for functionalising a surface of a substrate, the method comprising:
providing
a silicon-containing compound attached to a first functional compound and having two or more leaving groups, and
(ii) a second functional compound comprising at least one nucleophilic group;
contacting the silicon-containing compound and the second functional compound with a surface of a substrate having nucleophilic sites thereon; and
exposing the silicon-containing compound, the second functional compound and the surface of the substrate to microwave radiation.

In one preferred embodiment of the second aspect of the present invention, the first and second functional compounds are different.

In another embodiment, further functional compounds having at least one nucleophilic group may be provided.

In another embodiment, additional silicon-containing compounds attached to functional compounds may also be provided. These may have one or more leaving groups. Where the additional silicon-containing compound has two or more leaving groups the compound can be used to silicon-bind more functional compounds to the surface of the substrate. Where the additional silicon-containing compound has only one leaving group then it will bind on its own to the surface of the substrate.

In one embodiment of the second aspect of the present invention, the second functional compound, and optionally any further functional compounds provided, can have two or more nucleophilic groups. This allows the functional compound to attach to two or more silicon-containing compounds or to multiply adhere to a single silicon-containing compound (if the nucleophilic groups are suitably located in the structure of the functional compound). The additional bonding of the functional compound to the silicon-containing compound or to the surface of the substrate via multiple silicon-containing compounds allows the functional compound to adhere to the substrate more strongly. This can enhance the resilience of the functionalised substrate. For example, when the substrate is an item of clothing it can be made to retain its, functionality after a greater number of machine-wash cycles.

In one embodiment of the first and second aspects of the present invention the silicon-containing compound can be selected from a siloxane compound, a silanol compound, a silyl ether compound, a silanolate compound, a halosilane compound, a silatrane compound, and a silazane compound.

Furthermore, in one embodiment of the first and second aspects of the present invention the silicon-containing compound can be selected from [3-(trimethoxysilyl)propyl]-octadecyldimethylammonium chloride, 3(3-triethoxysilylpropyl)-5,5-dimethylhydantoin, (3-chloropropyl)triethoxysilane, octadecyltrimethoxysilane, 3-aminopropyltriethoxysilane, 3-(trimethoxysilyl)propyl-methacrylate, N-[3-(trimethoxysilyl)propyl]-ethylenediamine, 3-glycidoxypropyltrimethoxysilane and 1H,1H,2H, 2H-perfluorodecyltrimethoxysilane.

In one embodiment of the second aspect of the present invention the silicon-containing compound can be a compound of the Formula I

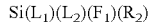    Formula I wherein $L_1$ and $L_2$ are leaving groups, $F_1$ is the first or second functional compound, and $R_1$ is selected from alkyl, alkylglycidoxy, alkylamino, aminoalkyl, acrylate, alkylhydantoin, alkylacrylate and alkylalkene, or may independently be a leaving group or a further functional compound. These compounds can also be used as the silicon-containing compound in the first aspect.

It should be noted that when a pre-functionalised compound is used in the method of the first aspect, for example, those compounds listed in the above paragraph, a di-functionalised (or even multifunctionalised) silicon-containing compound is silicon-bound to the surface of the substrate. The use of a pre-functionalised compound in the method of the first aspect adapts it to the method of the second aspect.

In one embodiment of the first or second aspects of the present invention, the steps (a)-(c) can be repeated. This can be done with the same or different silicon-containing compound. This can be done with the same or different functional compound or compounds. Repeating the steps with the same functional compound allows an increase in the coverage of the surface of a substrate with the functional compounds. Repeating the steps with a different functional compound allows the provision of a surface exhibiting multiple different functionalities.

According to the third aspect of the present invention there is provided a method for functionalising a surface of a substrate, the method comprising:
providing
a first silicon-containing compound attached to a first functional compound and having at least one leaving group, and
(ii) a second silicon-containing compound attached to a second functional compound and having at least one leaving group;
contacting the first and second silicon-containing compounds with a surface of a substrate having nucleophilic sites thereon;
exposing the first and second silicon-containing compounds and the surface of the substrate to microwave radiation;
wherein the first and second functional compounds are different.

In one embodiment of the third aspect of the present invention, the first and second silicon-containing compound are independently selected from a siloxane compound, a silanol compound, a silyl ether compound, a silanolate compound, a halosilane compound, a silatrane compound, and a silazane compound.

In one embodiment of the third aspect of the present invention the steps (a)-(c) can be repeated. This can be done with the same first and second silicon-containing compounds or preferably with different ones. That is, essentially, silicon-binding the same or different functional compounds to the surface of a substrate. Repeating the steps allows an increase in the coverage of the surface of a substrate with the functional compounds. Repeating the steps with different functional compounds allows the provision of a surface exhibiting multiple different functionalities.

In one embodiment of the third aspect of the present invention the first and second silicon-containing compound can be a independently a compound of the Formula II $$Si(L_1)(F_1)(R_1)(R_2) \qquad \text{Formula II}$$

wherein $L_1$ is a leaving group,
$F_1$ is the first or second functional compound, and
$R_1$ and $R_2$ are each independently selected from alkyl, alkylglycidoxy, alkylamino, aminoalkyl, acrylate, alkylhydantoin, alkylacrylate and alkylalkene, or may independently be a leaving group or a further functional compound.

In one embodiment of Formula I and Formula II above the leaving group or groups are independently of the Formula

wherein R is hydrogen or an alkyl, preferably a $C_1$ to $C_6$ alkyl, more preferably a $C_1$ or a $C_2$ alkyl, such as methyl or ethyl.

The term "leaving group" is well known in the art. See, for example, "Guidebook to Mechanism in Organic Chemistry" (1986) by Peter Sykes. As used throughout the specification it refers to a functional moiety that is designed to be easily displaced. Common leaving groups include moieties that are relatively stable once displaced and may include be moieties that are stabilised in the presence of acidic or basic condition. Common moieties are of the formula RO—, wherein R is hydrogen or an alkyl, preferably a $C_1$ to $C_6$ alkyl, more preferably a $C_1$ or a $C_2$ alkyl, such as methyl or ethyl. Other leaving groups include amines, alkylamines ($C_1$ to $C_6$ preferably), carboxylates ($C_1$ to $C_6$ preferably), alkylamides ($C_1$ to $C_6$ preferably), halides, azides and thiocyanates. In the above alkyl group chain length ranges, $C_1$ and $C_2$ alkyl groups are preferred.

$R_1$ and $R_2$, where present, preferably include electron donor groups. Electron donor groups include, but are not limited to, hydroxyl, amine, sulfhydryl and carboxyl.

Alkyl, except where otherwise defined in the specification is preferably a $C_1$ to $C_{25}$ alkyl, and may be $C_3$ to $C_{18}$ alkyl. Alkyl may be a substituted or non-substituted alkyl. The term "substituted" used in respect of the terms "alkyl" means that the group is substituted by one or more halogen or one or more identical or different groups selected from OH, linear or branched (C1-C6)alkoxy, amino, alkylamino and dialkylamino. Alkyl may be a halo-alkyl, preferably a haloalkyl in which a halo group is located at the distal end of the alkyl chain from the silicon. The haloalkyl is preferably a chloroalkyl.

Furthermore $R_1$, and/or $R_2$ can be of the Formula III

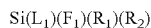 Formula III wherein Y is 1 to 5, preferably 3, $R_5$ is selected from hydrogen, halogen, $NH_2$, $C_1$ to $C_{18}$ alkyl,
$C_1$ to $C_{18}$ alkyldimethylammonium, alkylmethacryate, preferably ethyl or propylmethacrylate, 5,5-dialkylhydantoin, preferably 5,5-dimethylhydantoin, alkylenediamine, preferably ethylenediamine, perfluoroalkyl, preferably perfluorooctyl and 3-glycidoxy.

a. In any of the first, second and third aspects of the invention, the method may involve a solution of a suspension of the silicon-containing compound(s) and any functional compounds being contacted with the substrate. The solution and/or suspension preferably comprises a polar solvent, more preferably acetone and/or an alcohol, preferably both. The alcohol preferably comprises methanol and/or ethanol. Alternatively, the silicon-containing compound(s) and any functional compounds may be solvent-free, i.e. not in the form of a solution or suspension.

The silicon-containing compounds used in the present invention can be viewed as siloxane precursors. That is, if they bind to a surface of a substrate via an oxygen-containing nucleophilic group, then they will form a siloxane.

The steps recited in the methods of any of the first, second and third aspects of the present invention will normally be carried out in order. In one embodiment the steps (a)-(c) can be overlapped or can occur simultaneously. By way of example, a bolt of cloth or textile could be wound from a first reel to a second reel via a treatment tub wherein it is dipped in the provided components and simultaneously microwave irradiated.

The functional compounds used in each aspect can be independently selected from known functional compounds having known properties. Suitable known functional compounds may be a flame retardant, an oleophobe, an oleophile, a hydrophobe, a hydrophile, a haemostat, a bacteriostat, a biocide, an anti-microbial, a sporicide, an enzyme, a crosslinking precursor, a catalyst, or an antiviral, or is a compound known to exhibit anti-corrosion properties, detoxification properties, reducing properties, oxidising properties, gas/vapour permeability control, liquid permeability control, surface energy control or surface morphology control.

Examples of oleophobic compounds include fluorocarbons. Examples of hydrophobic compounds include alkyl groups ($C_7$ to $C_{50}$), fatty groups and oils. Superhydrophobic compounds may also be used. When a hydrophobic compound is bound to a surface in accordance with a method of the present invention it can provide a water contact angle in excess of 150°. Examples of biocidal or antimicrobial compounds include halamines, halamides or halimides, such as chloramides and hydantoins, and including chlorhexadine (a biguanide). Examples of flame retardant compounds include tetrakis(hydroxymethyl)phosphonium salts, halocarbons such as organochlorines including polychlorinated biphenyls (PCBs), chlorendic acid derivates (for example, dibutyl chlorendate and dimethyl chlorendate) and chlorinated paraffins, organobromines such as polybrominated diphenyl ether including pentabromodiphenyl ether, octabromodiphenyl ether, decabromodiphenyl ether and hexabromocyclododecane, organophosphates in the form of halogenated phosphorus compounds such as tri-o-cresyl phosphate, tris(2,3-dibromopropyl) phosphate (TRIS), bis(2,3-dibromopropyl) phosphate and tris(1-aziridinyl)-phosphine oxide.

In several embodiments of the present invention two or more different types of functional compounds can be silicon-bound to the surface of a substrate. This can provide multiple functionalities to the substrate. For example, a flame retardant functional compound and an oleophobic compound could be bound to the same fabric. This could provide clothing that would shed liquid fuels and be flame resistant. Alternatively, a medical dressing could be advantageously antibacterial and haemostatic. A breathing filter could be provided with enzymes to catalytically break down air-borne toxins and also include sporicide functional compounds. A lubricant gel comprising a substrate according to the present invention could provide enhanced anticorrosion and hydrophobic properties.

Using the method of the present invention it would be possible, for example, to provide an article of clothing that is waterproof, flame-resistant, insect repellent, antibacterial, antimicrobial (prevent odor), warm, breathes well and is lightweight.

In other embodiments of the present invention two or more similar types of functional compound can be silicon-bound to the surface of a substrate. For example, if two different flame retardants are silicon-bound to the same surface of a substrate then an enhanced flame retardant property may be observed.

a. In a further embodiment the functional compounds may be independently selected from substituted or unsubstituted moieties such as tetrahalobisphenol, catchetol, hydantoin, triethanolamine, a haloalkyl, a $C_6$ to $C_{50}$ alkyl, an alkylamine, a fluoroalkyl, a biguanide, an ester, an unsaturated alkyl, an amide, an amine, an imine, an imide, a hydroxyl, a thiol, a phosphonate, a phosphite, a phosphate, a sulfonate, a sulfite, a sulfonic acid, a sulfone, a carboxylate, a carboxylic acid, a phosphoric acid, an aldehyde, a carbonyl, an ester, an aldehyde, an alkyne, an acrylate, an acyl halide, a ylide, a phenol, a nitrite, a nitrile, a phthalate, a phthalic acid, an anhydride or a phthalimide. Particularly preferred moieties include sulfonic acids, amines, amides, biguanides (such as chlorhexidine), phenols (such as bisphenol or triclosan), alcohols, hydantoin and phthalimides. The term "substituted" means that the group is substituted by one or more halogen or one or more identical or different groups selected from OH, linear or branched $C_1$-$C_6$ alkyl, linear or branched ($C_1$-$C_6$)alkoxy, amino, alkylamino and dialkylamino.

In the second aspect of the present invention, where at least one functional compound is pre-bound to a silicon-containing compound, the pre-binding can be done by any conventionally known method. Similarly, in the third aspect, the first and second functional compounds can be bound to their respective silicon-containing compounds by any conventionally known method.

In one embodiment of any of the first, second or third aspects, due to the reaction conditions or the nature of the functional compounds, it may be necessary to protect the functionalities of the functional compounds before they are microwave-treated and attached to the surface of the substrate. Alternatively, it may be necessary to attach a precursor of the desired final functional compound. This may be necessary, for example, when incompatible functional compounds are to be silicon-bound to the same surface. For example, compounds having acidic and basic groups or oxidising and reducing groups. Accordingly, the method may comprise a further step of deprotecting the first and/or second functional compound if they were pre-protected. Alternatively, the method may comprise a further step of activating a precursor functionality of the first and/or second functional compound. These steps might, depending on the functional compounds, be necessary to exhibit the functional benefits of the functionalised surface of the substrate. The use of protective groups is known in the art, for example, see "Protective Groups in Organic Synthesis" (2006) by Peter G. M. Wuts and Theodora W. Greene.

The same substrates can be used in the first, second and third aspects of the present invention. The substrate has nucleophilic sites on its surface or one or more compounds having nucleophilic groups are present on the surface. The one or more compounds having nucleophilic groups can comprise an alcohol. The nucleophilic sites comprise one or more nucleophilic groups containing one or more of O, S and N. For example, the nucleophilic groups may be selected from OH, SH and $NH_2$. In the third aspect the substrate has at least two nucleophilic sites or groups thereon.

Preferably the substrate is a fabric material. Such a fabric material is woven or nonwoven. The substrate may comprise a natural material or a synthetic material. The material may be a cloth material. The material may comprises fibres of natural and/or synthetic material. In one embodiment the fabric material is selected from one or more of cotton, polyester, nylon, wool, leather, rayon, polyethylene, polyvinylchloride, polyvinylalcohol, polyvinylamine and polyurea.

The substrate may be in the form of particles. The particles may have a diameter of from 10 nm to 1 mm, preferably 100 to 1000 nm.

The substrate may comprise a metal oxide. The metal oxide may be selected from one or more of aluminium oxide, titanium dioxide, magnesium oxide, calcium oxide, silicon dioxide and zinc oxide.

The substrate may comprise a natural mineral. The substrate may comprise one or more materials selected from kaolinite, barasym, silica, montmorillonite, vermiculite, bohemite and quartz.

The substrate may be porous. The substrate may comprise a molecular sieve. The substrate may comprise a zeolite.

The substrate may comprise a polymer. The polymer may be in the form of a porous matrix. The substrate may comprise a plastic material. The substrate may comprise polyurethane and/or nylon, polyester, nylon, rayon, polyethylene, polyvinylchloride, polyvinylalcohol, polyvinylamine and polyurea.

The substrate may comprise a carbohydrate.

In the first, second and third aspects of the present invention, an alcohol may be present. The substrate may comprise an alcohol. The substrate may have an alcohol on its surface. The alcohol may comprise a diol, which may be a vicinal diol, or a triol. The alcohol may be selected from one or more of an alkyl diol, preferably a $C_2$ to $C_{25}$ alkyl diol, an alkyl triol, preferably a $C_3$ to $C_{25}$ alkyl triol and a phenyl diol, preferably a vicinal phenyl diol. Each hydroxyl group in the triol is preferably vicinal to one of the other hydroxyl groups. The alcohol may be selected from catechol, ethylene glycol or glycerol.

The substrate may comprise a silicon-dioxide based material, such as glass, silicon dioxide, sand and silica.

It has been found that the nucleophilic groups bind to the silicon atoms of the silicon-containing compounds on contact and with exposure to microwave radiation. This reaction normally occurs within seconds, as opposed to hours for conventional methods, such as merely heating.

The present inventors have found that the methods of the present invention can produce organised alignment (i.e. an array) of silicon-containing compounds on the surface of a substrate. The properties of the silicon-containing compounds often differ from those of the prior art, e.g. silicon compounds attached through the use of heat. For example, the silicon-bound functional compounds on the surface of the substrate may have different or enhanced physical and chemical properties such as increased hydrophobicity or hydrophilicity and/or increased biocidal efficacy. Without being bound by theory, it is believed that the use of microwave radiation induces a hypervalency around the silicon atom, i.e. it coordinates to more than 4, possibly to 5 or 6 available ligands. When the microwave treatment is stopped, the silicon will often relax back to a tetracoordinate state. The hypervalent state is believed to leads to a more organised arrangement of silicon-containing compounds on the surface of a substrate. Hypervalency in silicon has been shown to occur in the following known reaction between tetramethoxy silane and catechol, which was carried out in ethanol under microwave treatment:

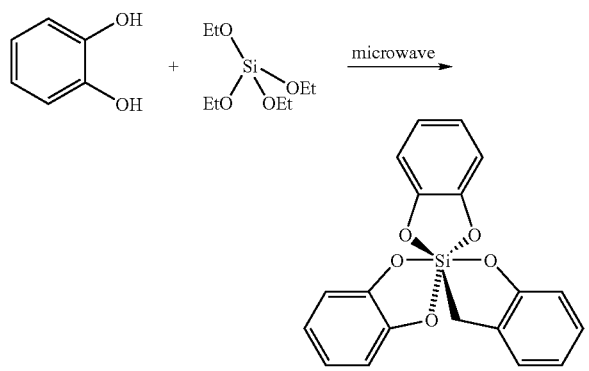

Other reactions known to result in hypervalent-silicon compounds include:

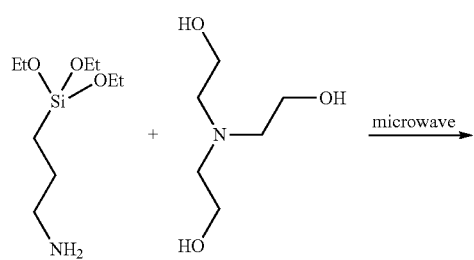

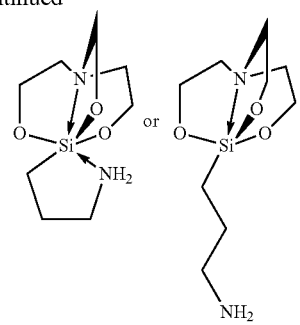

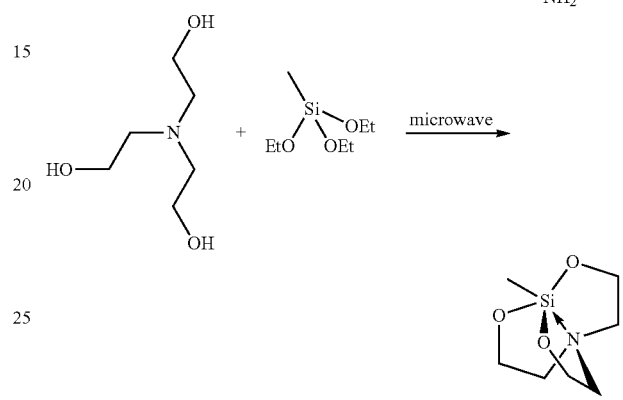

The above reactions and others that result in hypervalent silicon can be found in the following prior art documents: Chem. Rev. 1993, 93, 1371-1448, Chult et al; Chem. Rev. 1996, 96, 927-950, Holmes; and Journal of Organometallic Chemistry, 1990, 389, 159-168, Cerveau et al.

The hypervalent-silicon products produced in the above reactions are sufficiently stable to be characterised. It is believed that a similar hypervalency occurs in the processes of the present invention, although the hypervalent silicon may revert to a tetravalent silicon following microwave treatment. It is surprising that, irrespective of whether or not the silicon remains in a hypervalent state following the microwave treatment, a more organised arrangement of silicon-containing compounds on the surface of the substrate is observed.

Si—OR excitation via electromagnetic radiation in the presence of an appropriate electron donor facilitates the cleavage of the Si—OR bond and is believed to induce the formation of hypervalent siloxane species with available electron donors. The electron donor for this exchange can take the form of virtually any nucleophile, induced nucleophile, nucleophilic region, or Lewis base. The resulting hypervalent species is then thought to either relax into their ground state, at which time the silane species is tetracoordinate, or, if the hypercoordinated product is stable, the silane product can remain in the hypervalent state as either a pentacoordinate or hexacoordinate system. The electromagnetic excitation within the siloxane induces specific conformations within the new species, which leads to increased and specific organization in the resting state of the newly formed species.

If the substrate is a polymer, the specific organization of the silicon-containing on the surface or in the matrix of a polymer can change the chemical and physical properties of the polymer as a whole. This phenomenon is not temperature dependent.

The methods of the present invention avoid the need to use activators, catalysts and conventional curing processes. This therefore allows the attachment of 'delicate' functionalities.

For example, glycidoxy containing siloxane and acrylate containing siloxanes are examples of delicate silicon-containing compounds and proteins/enzymes are examples of delicate substrates, to which one may wish to attach a silicon-containing compound.

The microwave treatment of the present invention is used to excite the silicon centres of the silicon-containing compounds to the hypervalent state. The microwave treatment is not used to provide heat energy as in conventional applications. Indeed, the substrate and compounds are hardly, if at all, warmed by the treatment. If heating occurred (as in prior art methods) then isolated siloxane condensates would be produced rather than a useful product.

The present inventors have discovered that the methods of the present invention provide a number of unexpected benefits. The produced surfaces exhibit different properties to those produced by conventional heat treatment processes. Conventionally incompatible (i.e., inter-reactive) compounds can be attached to the surface.

Without wishing to be bound by theory, it is believed that the methods of the present invention can provide a surface with a more uniform distribution of the functional compounds. This may be because the very fast reaction rate under microwave exposure binds the functional compounds to the surface before there is a chance for substantial surface rearrangement. This can provide a more homogeneous arrangement of the functional compounds on the surface of the substrate. In particular, in embodiments where more than one type of functional compound is silicon-bound to the surface the functional compounds can be evenly distributed. This is in contrast to the tendency to form domains on the surface of the substrate seen in heat-attachment methods.

Furthermore, without wishing to be bound by theory, when two or more different functional compounds are silicon-bound to a surface by microwave treatment the speed of the reaction allows both compounds to bind in similar amounts (or at least in amounts reflecting the ratio of their presence in the treatment process). This differs from thermodynamically controlled reactions where one species may bind preferentially and hinder the formation of a multifunctional substrate.

The first and second aspect of the present invention provides an unexpectedly simple and efficient method of attaching functional compounds to the surface of a substrate. The one-pot reaction eliminates the need for prior attachment of functional compounds to a silicon-containing compound. The microwave treatment allows the quick and effective binding of functional compounds.

Furthermore, when more than one functional compound is used in the method of the first aspect of the present invention then the advantages associated with the second and third aspect are also observed.

Preferably, the microwaves are produced using a power rating of 650 Watts or less, more preferably of from 65 to 650 Watts. The microwaves may be produced using a power rating of from 135 to 400 Watts.

The microwave radiation preferably has a frequency of from 0.3 to 30 GHz. More preferably, the microwaves have a frequency of from 0.3 to 10 GHz, more preferably of from 1 to 3 GHz.

To reduce the possible degradation of delicate silicon-containing compounds and/or delicate substrates, one or more of the following may be used: irradiation at a reduced power level, for example microwaves produced using a power rating of 400 Watts or less, preferably 135 Watts or less, or subjecting the substrate and silicon-containing compounds to microwave irradiation and relaxation (no microwave irradiation) in alternating intervals: for example a period of irradiation of preferably 5 to 30 seconds, more preferably 10 to 20 seconds, most preferably 15 seconds, followed by a period of relaxation of preferably 2 to 30 seconds, more preferably 5 to 15 seconds, most preferably 10 seconds, and optionally repeating this process as often as required. It has been found that, for many compounds containing an Si—O moiety, this is more sensitive to microwave radiation than other 'delicate' functionalities and therefore cleavage of the Si—O bond may be achieved without degradation of the other functionalities. This is an improvement over the prior art that recites heating of silicon-containing compounds for periods to attach them to a substrate, as these methods can lead to degradation of the delicate functionalities in the silicon-containing molecules, since the heat required to cleave the Si—O bond is sufficient to degrade the delicate functionalities.

The microwaves can be directed at particular portions of the substrate and therefore allows for regioselective attachment and/or arrangement of the silicon-substituted compounds and for reactions that can be initiated that would not be possible using traditional methods.

The present invention has been found to be far more effective in attaching functional compounds to a substrate surface compared to traditional methods such as heating and using activators—more than 80% of the silicon-containing compounds can be attached under certain conditions to the surface using the methods of the present invention.

According to a fourth aspect of the present invention there is provided a fabric material comprising the functionalised substrate made according to a method of the present invention.

According to a fifth aspect of the present invention there is provided a gel, lotion, cream or adhesive composition comprising a substrate made according to a method of the present invention.

The aspects of the present invention will now be illustrated with reference to the following non-limiting Examples.

A biocidal, oil/water repellent material was produced by contacting a hydantoin, a perfluoroalkane having a nucleophilic group (an acid, amine, carboxyl, etc) and a silicic acid, alkoxysilane, or halosilane with a substrate and providing microwave radiation.

A biocidal, oil/water repellent material was produced by contacting a siloxylhydantoin and a perfluoroalkane having a nucleophilic group (an acid, amine, carboxyl, etc) with a substrate and providing microwave radiation.

A biocidal, flames retardant material was produced by contacting Chlorhexidine and tetrabromobisphenol-A and a silicic acid, alkoxysilane, or halosilane with a substrate and providing microwave radiation.

A biocidal, water wicking material was produced by contacting polyethylene glycol, a quaternary ammonium salt and a silicic acid, alkoxysilane, or halosilane with a substrate and providing microwave radiation.

An oil/water repellent, flame retardant material was produced by contacting siloxylperfluoroalkane, tetrabromobisphenol-A and a silicic acid, alkoxysilane, or halosilane with a substrate and providing microwave radiation.

The invention claimed is:

1. A method for functionalizing a surface of a substrate, the method comprising:
(a) providing
(i) a silicon-containing compound having two or more leaving groups, and
(ii) a first functional compound comprising at least one nucleophilic group;

(b) contacting the silicon-containing compound and the functional compound with a surface of a substrate having nucleophilic sites thereon; and (c) exposing the silicon-containing compound, the functional compound and the surface of the substrate to microwave radiation, wherein the microwave treatment is not used to provide heat energy such that the substrate and the compounds are either not warmed by the treatment or warmed below 40° C.

2. The method according to claim 1, wherein at least a second functional compound is also provided, wherein the functional compounds are different and wherein each functional compound comprises at least one nucleophilic group.

3. The method according to claim 1, wherein at least one of the first functional compound and the at least one second functional compound, if present, has two or more nucleophilic groups to allow the functional compound to adhere to the substrate via more than one silicon-containing compound.

4. The method according to claim 1, wherein the silicon-containing compound is selected from a siloxane compound, a silanol compound, a silyl ether compound, a silanolate compound, a halosilane compound, a silatrane compound, and a silazane compound.

5. The method according to claim 4, wherein the silicon-containing compound is selected from orthosilicic acid, a tetraalkoxysilane, tetramethoxysilane tetraethoxysilane, a tetraacyloxysilane, tetraformyloxysilane or tetraacetoxysilane, tetraminosilane, or a tetra(alkylamino) silane.

6. A method according to claim 4, wherein the silicon-containing compound is selected from the group consisting of [3-(trimethoxysilyl)propyl]-octadecyldimethylammonium chloride, 3(3-triethoxysilylpropyl)-5,5-dimethylhydantoin, (3-chloropropyl)triethoxysilane, octadecyltrimethoxysilane, 3-aminopropyltriethoxysilane, 3-(trimethoxysilyl)propyl-methacrylate, N-[3-(trimethoxysilyl)propyl]-ethylenediamine, 3-glycidoxypropyltrimethoxysilane and 1H,1H,2H,2H-perfluorodecyltrimethoxysilane.

7. The method according to claim 1, wherein steps (a)-(c) are repeated with the same or different silicon-containing compound, and at least one different functional compound.

* * * * *